Figure 7:
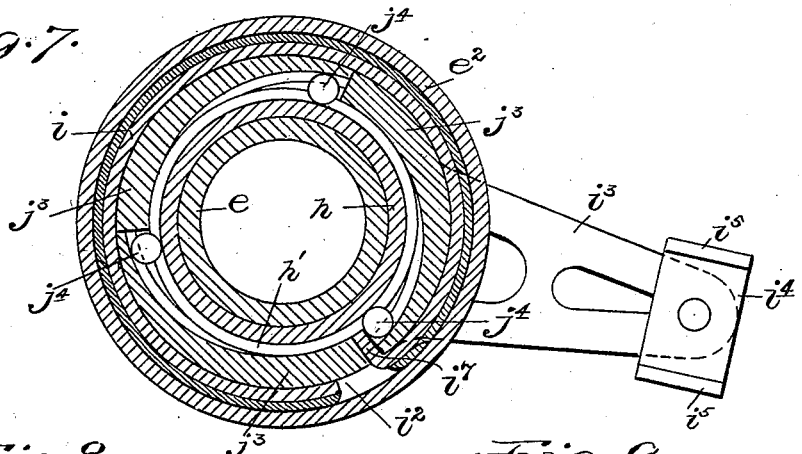

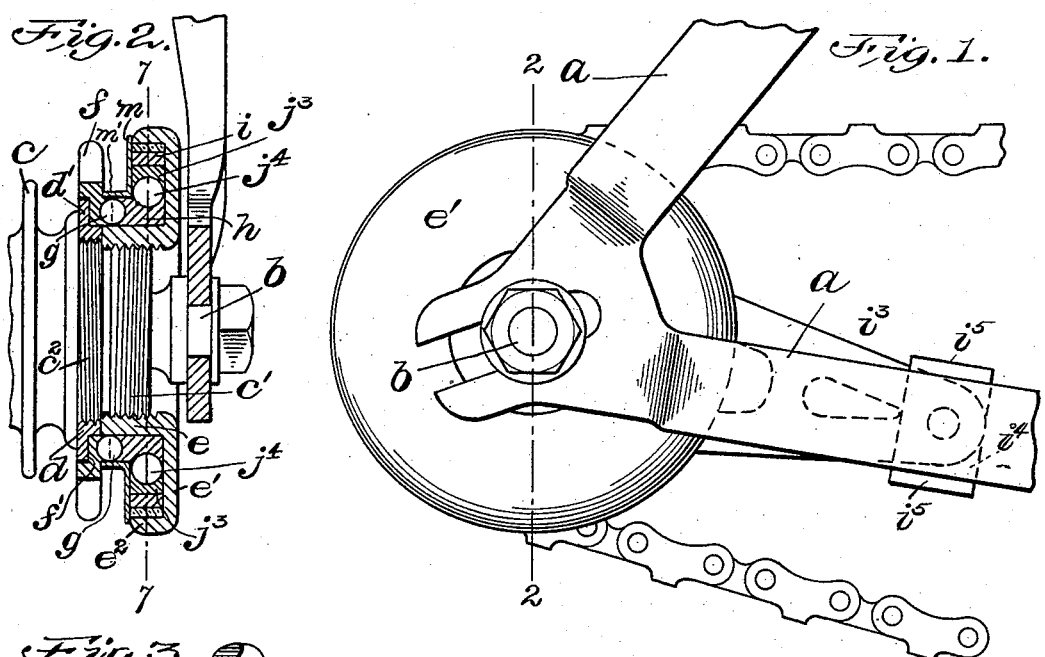

No. 723,352. PATENTED MAR. 24, 1903.
R. ABELL.
BACK PEDALING BRAKE AND COASTER.
APPLICATION FILED OCT. 16, 1900.
NO MODEL. 3 SHEETS—SHEET 2.

Witnesses:
Alice R. Brown
John Murray Marshall

Inventor:
Rollin Abell,
by Frank Parker Davis,
Atty.

No. 723,352. PATENTED MAR. 24, 1903.
R. ABELL.
BACK PEDALING BRAKE AND COASTER.
APPLICATION FILED OCT. 16, 1900.
NO MODEL. 3 SHEETS—SHEET 3.

Witnesses:
Walter P. Abell.
Alice Richmond Brown.

Inventor:
Rollin Abell
by Frank Parker Davis
Atty.

UNITED STATES PATENT OFFICE.

ROLLIN ABELL, OF BOSTON, MASSACHUSETTS.

BACK-PEDALING BRAKE AND COASTER.

SPECIFICATION forming part of Letters Patent No. 723,352, dated March 24, 1903.

Original application filed June 8, 1900, Serial No. 18,508. Divided and this application filed October 16, 1900. Serial No. 33,222. (No model.)

*To all whom it may concern:*

Be it known that I, ROLLIN ABELL, of Boston, in the county of Suffolk and State of Massachusetts, have invented certain new and useful Improvements in Back-Pedaling Brakes and Coasters, of which the following is a description sufficiently full, clear, and exact to enable those skilled in the art to which it appertains or with which it is most nearly connected to make and use the same.

This invention relates to back-pedaling bicycle brakes and coasters; and the chief aim is to provide a construction which will not only permit free forward turning of the driven member while the driving-gear is held stationary and bring about an application of the brake upon rearward movement of the driving-gear, but will also permit free rearward turning of said driven member. In the majority of cases where a one-way driving connection is provided between the driving and driven members the rearward turning of the latter necessarily produces a corresponding movement of the driving member, which brings about an application of the brake, and therefore absolutely prevents free rearward turning of the driven member. By my improved construction rearward turning of the driven member effects a disengagement between it and the driving-gear, and although rearward turning of the latter will take place it is accompanied by disengagement of said driving member from the driven member, which of course puts an end to the rearward turning of the driving member by the driven member. The invention provides for such a rearward movement of the driving member without its affecting the brake, the latter being only applied by rearward turning of the driving member brought about through back-pedaling or similar application of power to turn the driving member farther than a rearward movement of the driven member can move it.

Another object of the invention is to provide an improved form of brake wherein an expansible brake-band is used and buckling of the same is absolutely prevented, a braking engagement between the band and the driven member being insured throughout the extent of the band, so that there will be no uneven wear of the latter and no possibility of screeching when an application of the brake is effected.

In so far as this application relates to a brake *per se* of the character above indicated it constitutes a division of an application filed by me June 8, 1900, Serial No. 18,508.

In combining with this brake means for permitting free backward turning of the driven member compactness of structure is still preserved, so that, accomplishing all that it does, a construction embodying the present invention requires so little lateral space as to be easily accommodated between one end of the wheel-hub of a bicycle and the frame.

Figure 8:
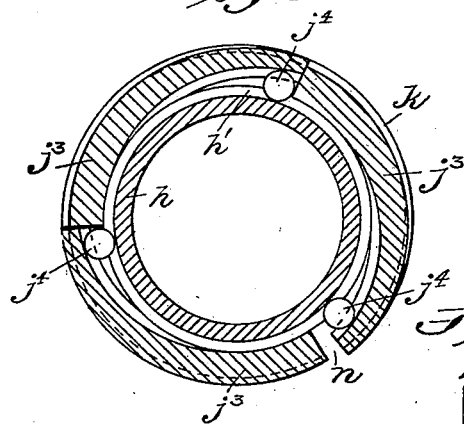
Figure 9:
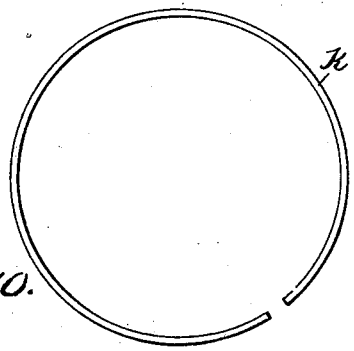
Figure 10:
Figure 11:
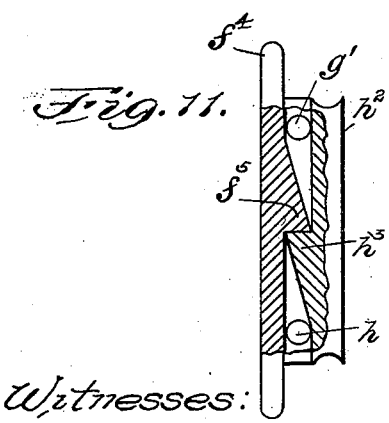
Figure 12:
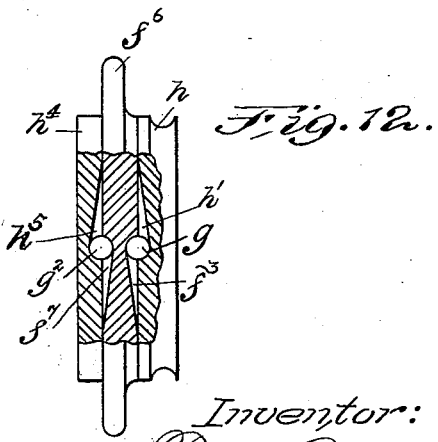
Figure 13:
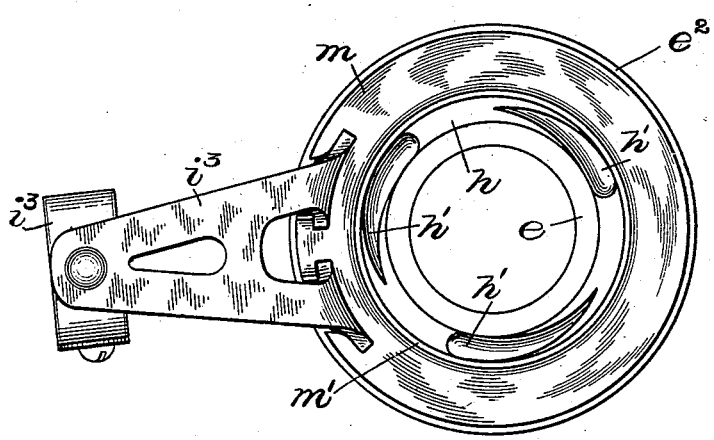

Of the drawings which accompany and form part of this specification, Figure 1 represents in side elevation a portion of the rear part of a bicycle with my invention embodied therein. Fig. 2 is a sectional view taken on the line 2 2 of Fig. 1. Fig. 3 represents the rear wheel-sprocket in perspective. Fig. 4 similarly represents a brake-actuating sleeve. Fig. 5 represents said sprocket and sleeve relatively positioned for an application of the brake upon the rearward turning of the sprocket, with both sprocket and sleeve out of driving engagement with the driven member, the parts being represented as broken away to disclose the clutch, and the whole being shown somewhat diagrammatically. Fig. 6 similarly illustrates the relative positions of these parts when the sprocket and sleeve are in driving engagement with the driven member. Fig. 7 is a sectional view taken on the line 7 7 of Fig. 2. Fig. 8 is a sectional view somewhat similar to Fig. 7, but omitting the brake-band and drum and illustrating an additional feature in the form of an encircling spring. Fig. 9 shows said spring detached. Fig. 10 is a sectional detail taken on the line 10 10 of Fig. 8. Figs. 11 and 12 are views similar to Fig. 5, illustrating modifications of the clutch; and Fig. 13 represents the brake in elevation as viewed from the inner side, with the sprocket and hub omitted.

In the drawings, reference-letter *a* designates the frame of a bicycle; *b*, the rear axle, adjustably affixed thereto, and *c* the rear wheel-hub, journaled upon said axle and formed with two sets of exterior screw-threads $c'$ and $c^2$ and a shoulder at the base of the inner set. A ring $d$ engages the latter and is formed with an annular outstanding flange $d'$, whose outer face lies in a plane at right angles to the axis of the hub and constitutes a clutching-surface. The outer set of screw-threads $c'$ receives the reëntrant sleeve-like portion $e$ of a disk $e'$, formed at its outer part with an inwardly-projecting annular flange $e^2$, giving the disk a drum-like form, and said sleeve-like portion screws up against the ring $d$ and locks the same in place. A sprocket-wheel $f$ encircles the ring $d$, being recessed on the inner side to receive the flange $d'$ thereof, with the base of the recess constituting a clutching-surface $f'$ to engage that furnished by the outer face of said flange, and being formed on the opposite side with an outwardly-projecting annular flange $f^2$, in the face of which equidistant tapering grooves $f^3$ are formed. Rollers in the form of balls $g$ engage these grooves, there being one ball in each groove and the deep end of the latter being formed as a socket, in which the ball will seat, and the grooves are transversely curved throughout in conformity with the curvature of the balls, so as to properly confine the latter. A sleeve $h$ loosely encircles the sleeve-like central portion $e$ of the disk or drum $e'$ and is formed in its inner end surface with grooves $h'$, corresponding in form and relative location with the grooves $f^3$ of the sprocket, but tapering in an opposite direction thereto. The balls $g$ engage the said grooves $h'$, respectively, and when these balls are seated in the deep ends of the grooves, as shown in Fig. 5, the sprocket and sleeve may be brought together laterally, so as to occupy a minimum amount of space. The outer end surface of the sleeve confronts the inner wall of the disk $e'$, so that when the balls operate to spread apart the sprocket and sleeve the latter will be pressed against said wall of the disk, while the sprocket is pressed against the lateral clutching-surface of the ring $d$. It is in this manner that a driving engagement is effected between the sprocket and the wheel-hub, for it will be seen that when power is applied to turn the sprocket forward the balls will leave the deep ends of the grooves and become wedged between the tapering bottoms of the latter, as illustrated in Fig. 6. It will also be seen that rearward turning of the sprocket by back-pedaling will result in rearward turning of the sleeve through the medium of the rollers when the latter seat in the deep ends of the grooves.

It is to be noted that while the above-described construction provides for effecting a driving engagement between the sprocket and the hub during forward turning of the sprocket, yet the hub may turn freely in either direction independently of the sprocket. It is quite obvious that this can take place whenever the rollers are in the deep ends of the grooves, for then there is no rotative connection between the hub and the sprocket, and this relation of parts will always ensue either from forward rotation of the hub when the sprocket is restrained or from backward rotation of the hub. In further explanation of this it may be said that when the hub is being driven forward by the sprocket-wheel both the latter and the sleeve $h$ are in driving engagement with the hub. Now if the sprocket is restrained continued forward rotation of the hub will carry the sleeve forward, and hence the balls are rolled into the deep ends of the grooves, and the hub will run freely. The effect of rearward rotation of the hub will be further explained after the connection of the sleeve $h$ with the brake has been described.

That portion of the sleeve $h$ which is within the circle of the drum-flange $e^2$ is circumferentially grooved, as shown at $h''$, to accommodate rollers in the form of balls $j^4$, constituting media through which the brake is applied.

The brake proper comprises a band $i$, lying within the flange of the drum $e'$ and faced with compressed fiber or other suitable friction material for contact with said flange, this band being divided at $i^2$, so as to render it expansible by pressing one end away from the other. An arm $i^3$ springs from the inner edge of the band adjacent to one end of the latter and extends radially for engagement with the frame, said arm having a pivoted head $i^4$, formed with lugs $i^5$, which are adapted to engage above and below a bar of the frame, as shown in Fig. 1, and hold the brake-band from turning. At the extremity of the end portion of the brake-band from which said arm $i^3$ springs there is formed an inwardly-projecting lip or lug $i^7$, and between the band and the sleeve $h$ there is interposed a set of segmental shoes $j^3$, extending from one side of said lug around to the other side thereof, as shown in Fig. 7. Each of said shoes is tapered on the inner side and formed with a correspondingly-tapered groove, which is engaged by one of the balls $j^4$, the large end of one shoe confronting the small end of the neighboring shoe and closing the groove thereof and forming with the tapering inner face of said neighboring shoe a pocket for the roller. Forward turning of the sleeve $h$ carries said rollers to the deep ends of the pockets, where two of the rollers come up against the large ends of two of the segmental shoe-sections, respectively, while the third comes up against the lug $i^7$, which intervenes between two of the segmental shoe-sections, the sectional shoe extending from one side of said lug around to the other. By this arrangement buckling of the brake-band is absolutely prevented, and a braking engagement of the same throughout its extent is insured, so that there will be no uneven wear and no possibility of screeching when an application of the brake is effected. The principle of action is, however, the same as with the form of construction described in my former application hereinbefore mentioned, the outward movement of the shoe pressing the brake-band into engagement with the flange $e^2$ and the continued forward rotation of the latter expanding the band through the frictional connection thus effected between it and the latter.

In order to insure a constant engagement between the rollers and the sprocket-sleeve and to obviate the possibility of said rollers sticking in the deep ends of the pockets when gummed up, I may construct the segmental sections of the shoe so that when their outer sides or edges together form a circle the deepest ends of the pockets will not wholly accommodate the rollers, but the latter will protrude within the circle of those portions of the inner sides or edges of the segments which do not partake of the taper, such circle corresponding with that of the exterior of the sprocket-sleeve. A spring in the form of a divided resilient ring $k$ encircles the sectional shoe lying in a V-shaped groove $k'$ thereof, and this spring is under stress when occupying said groove, so that it exerts itself to bring the segments to relative positions wherein the outer sides or edges of the segments form a circle. Therefore when the said sleeve is in place these rollers must of necessity be pressed back against the resiliency of the spring $k$, the small ends of the shoe-sections retreating correspondingly. In Fig. 8 the relative positions of the parts under these conditions is illustrated in an exaggerated way, and it will be understood that the space $n$ between two of the sections is occupied by the brake-band lug $i^7$ when all the parts are properly assembled.

Reverting to the question of rearward turning of the hub, it may now be explained that such movement thereof when the driving-sprocket and sleeve are relatively positioned as in Fig. 6 would at the outset tend to turn backward both the sprocket and the sleeve; but backward rotation of the latter is resisted by the brake, and so the rollers $g$ betake themselves to the deep ends of the grooves and then the hub runs freely backward.

In the modified form of driving-clutch shown in Fig. 11 the rollers do not constitute the means for rotatively connecting the sprocket and sleeve for backward movement; but the sprocket $f^4$ is formed on the outer side with a circular series of long ratchet-teeth $f^5$, having sloping back surfaces and square ends, and the sleeve $h^2$ is formed with a corresponding series of oppositely-facing teeth $h^3$, with which the teeth $f^5$ interlock under rearward turning of the sprocket, as represented in Fig. 11. The rollers $g'$ are accommodated in the spaces between the teeth, and forward turning of the sprocket causes a wedging of said rollers between the sloping backs of the teeth and the opposite surfaces of the sprocket or sleeve, so that these members will be forced apart and into driving contact with the hub.

In the modification illustrated in Fig. 12 the sprocket $f^6$ does not necessarily partake of lateral movement nor have direct lateral contact with the hub. The arrangement of the sleeve $h$ and the clutching devices between it and the sprocket on the outer side of the latter is the same as heretofore described with relation to Figs. 1 to 6. This arrangement is duplicated on the inner side of the sprocket, which is grooved, as at $f^7$, for rollers $g^2$, a sleeve $h^4$ being interposed between the sprocket and the hub and correspondingly grooved, as at $h^5$. This sleeve then, instead of the sprocket, is pressed into contact with the lateral clutching-surface of the hub when the sprocket turns forward.

It is to be noted that in all of these different forms of driving-clutches conical clutching-surfaces are obviated. It is further to be noted that the base-lines of confronting grooves, pockets, or ball-spaces in the driving members are parallel, so that wedging engagements of the balls with the latter will occur at various places along such parallel lines and there will not be constant recurrence of engagement at the same places, with consequent indentations calculated to impair the efficiency of the clutch.

It will be seen that the construction of coasting and back-pedaling appliance here shown occupies an extremely limited space and requires no unusual form of wheel-hub. Furthermore, the working parts are well housed, so that dust is excluded and an attractive appearance presented. On the outer side the drum itself acts as a dust-guard, and on the inner side of the drum a plate $m$ covers the working parts, being flanged, as at $m'$, to cover the joint between the sprocket and the sleeve $h$, as shown in Fig. 2. This plate may be simply loosely placed in position, so as to be free to rotate; but the presence of the brake-arm $i^3$ obviously necessitates an engagement between the same and the plate which prevents turning of the latter. (See Fig. 13.)

It is to be understood that other modifications than those herein described may be made without departing from the invention, which is capable of embodiment in many other ways than here shown.

A different form of one-way driving connections between the sprocket and the hub than that here shown can obviously be employed in connection with the brake construction herein disclosed.

Having thus described my invention, what I claim as new is as follows:

1. The combination of a driven member having lateral clutching-surfaces lying in planes substantially at right angles to the axis thereof; a driving member composed of a plurality of separate parts mounted between the said surfaces and having in the confronting faces of its parts juxtapositioned tapering roller-ways with parallel bases; and a roller engaging said ways and adapted under forward rotation of one part of the said driving member to effect a relative lateral movement of the parts of the driving member and consequent driving engagement between the same and the driven member by frictional engagement between confronting lateral surfaces, substantially as described.

2. The combination of a driven member having lateral clutching-surfaces; a driving member comprising a plurality of separate parts arranged between said surfaces and having lateral clutching-faces to engage the same respectively and also confronting clutching-faces with provisions for effecting lateral displacement of the parts of the driving member relative to each other upon forward turning of one of them and provisions for rotatively connecting said parts together under rearward turning thereof; and a brake arranged to be applied by such rearward turning of the driving member.

3. The combination of a driven member having lateral clutching-surfaces; a driving member comprising a plurality of separate parts arranged between said surfaces and having lateral clutching-faces to engage the same respectively, and also confronting clutching-faces, rollers engaging the latter to effect lateral displacement of the parts of the driving member relative to each other upon forward turning of one of them together with provisions for rotatively connecting said parts together under rearward turning thereof; and a brake arranged to be applied by such rearward turning of the driving member.

4. The combination of a driven member having lateral clutching-faces; a driving member composed of two or more separate parts arranged between said surfaces and having tapering pockets in their confronting surfaces; and rollers in said pockets constituting driving connections between the parts of said driving member when engaged with the deep ends of the pockets and wedging means when carried out of said deep ends to force the parts of the driving member into contact with the clutching-surfaces of the driven member, substantially as described.

5. The combination of a driven member having a plurality of lateral clutching-surfaces, a driving-gear mounted on the driven member between the said surfaces and having tapering grooves or pockets in opposite sides, driving-sleeves mounted on the driven member at opposite sides of the said gear and having tapering pockets in their inner surfaces facing those of the gear, the outer faces of the sleeves adapted to frictionally engage the lateral surfaces of the driven member; and rollers interposed between the sleeves and the driving-gear and engaging the pockets of the same.

6. The combination with a wheel-hub having lateral clutching-surfaces; of a gear and sleeve mounted on the hub between said lateral clutching-surfaces and having confronting tapered pockets in their own lateral faces, rollers in the pockets constituting driving connections between the said gear and sleeve when engaged with the deep ends of the pockets under rearward rotation of the gear, and wedging means when carried out of said deep ends by forward rotation of the gear, to force the latter and the sleeve into contact with the clutching-surfaces of the driven member respectively, a brake, and a clutch between the same and the sleeve for operating the brake upon rearward turning of the gear, substantially as described.

7. The combination of a driven member having lateral clutching-surfaces and an internal concentric braking-surface; a driving member composed of a plurality of separate parts arranged between said lateral clutching-surfaces and having tapering pockets in their own confronting surfaces; rollers in said pockets constituting driving connections between the parts of said driving member when engaged with the deep ends of the pockets, and wedging means when carried out of said deep ends to force the parts of said driving member into contact with the clutching-surfaces of the driven member; a brake arranged within the concentric braking-surface of the hub; and wedging means interposed between the said brake and one part of the driving member and operating upon rearward turning of the latter to apply the brake, substantially as described.

8. The combination of a driven member having lateral clutching-surfaces and an internal concentric braking-surface; a driving member composed of a plurality of separate parts arranged between said lateral clutching-surfaces and having tapering pockets in their own confronting surfaces; rollers in said pockets constituting driving connections between the parts of said driving member when engaged with the deep ends of the pockets, and wedging means when carried out of said deep ends to force the parts of said driving member into contact with the clutching-surfaces of the driven member; a divided brake-band arranged within the concentric braking-surface of the hub and having one end fixed through engagement with the frame of the machine; segmental shoes interposed between the said brake-band and one part of the driving member and tapered to form pockets; and rollers in said pockets and operating upon rearward turning of said part of the driving member to force the said shoes outwardly, substantially as and for the purpose described.

9. The combination of the wheel-hub having a flanged disk or drum and lateral clutching-surfaces, a driving-gear journaled on the hub between said surfaces; a sleeve also journaled on the hub between the lateral clutching-surfaces; clutching means interposed between the gear and sleeve to connect the same for rearward rotation and to force the same apart under forward rotation; an expansible brake-band in the drum or flanged disk and having one end fixed through engagement with the frame of the machine; and clutching means interposed between said band and the sleeve to expand the band upon rearward rotation of the latter, substantially as described.

10. The combination of the wheel-hub having a flanged disk or drum and lateral clutching-surfaces, a driving-gear journaled on the hub between said surfaces; a sleeve also journaled on the hub between the lateral clutching-surfaces; clutching means interposed between the gear and sleeve to connect the same for rearward rotation and to force the same apart under forward rotation; an expansible brake-band in the drum or flanged disk and having one end fixed through engagement with the frame of the machine; a series of segmental shoes arranged within the brake-band and formed to provide tapering pockets around the sleeve; and rollers in said pockets.

11. The combination of a driven member having an internal braking-surface; a driving member mounted upon the driven member with one-way connections thereto and extending within the circle of the said braking-surface; an expansible brake-band confronting the latter and having one end portion fixed through engagement with the frame of the machine; a sectional shoe interposed between the brake-band and the driving member, the members of said shoe being arranged end to end and being correspondingly tapered on their inner sides; and rollers occupying the pockets formed by the latter and engaging the driving member, substantially as and for the purpose described.

12. The combination of a driven member having an internal braking-surface; a driving member mounted upon the driven member with one-way connections thereto and extending within the circle of the said braking-surface; an expansible brake-band confronting the latter and having one end portion fixed through engagement with the frame of the machine and being formed with an inturned lug; a sectional shoe interposed between the brake-band and the driving member, the members of said shoe being arranged end to end with the lug of the brake-band interposed between two of them, and said shoe-sections being tapered on their inner sides; and rollers occupying the pockets formed by the latter and engaging the driving member, substantially as and for the purpose described.

13. The combination of a driven member having an internal braking-surface; a driving member mounted upon the driven member with one-way connections thereto and extending within the circle of the said braking-surface; an expansible brake-band confronting the latter and having one end portion fixed through engagement with the frame of the machine; a sectional shoe interposed between the brake-band and the driving member, the members of said shoe being arranged end to end and being correspondingly tapered on their inner sides; rollers occupying the pockets formed by the latter and engaging the driving member; and a spring encircling the sectional shoe, substantially as and for the purpose described.

14. The combination of a driven member having an internal braking-surface; a driving member mounted upon the driven member with one-way connections thereto and extending within the circle of the said braking-surface; an expansible brake-band confronting the latter and having one end portion fixed through engagement with the frame of the machine, and being formed with an internal lug, a sectional shoe interposed between the brake-band and the driving member, the members of said shoe being arranged end to end, with a lug of the brake-band interposed between two of them, and said shoe-sections being tapered on their inner sides; rollers occupying the pockets formed by the latter and engaging the driving member; and a spring encircling the sectional shoe, substantially as and for the purpose described.

15. The combination with the driven and driving members having one-way connections between them, of an expansible brake-band arranged to engage the driven member and having one end portion fixed; a shoe engaging said band and composed of a number of separate segments placed end to end and radially movable independently of each other; and means interposed between each shoe-segment and the driving member for moving the same radially outward upon rearward turning of the said driving member, thereby expanding the brake-band into engagement with the driven member substantially throughout the circumferential extent of the brake-band.

16. The combination with a driven member having an internal braking-surface; a driving member mounted upon the driven member with one-way connections thereto and extending within the circle of the said braking-surface; an expansible brake-band confronting the latter and having one end portion fixed through engagement with the frame of the machine, said band having a lug or lip at the extremity of its fixed end portion; a segmental shoe normally abutting said lip and interposed between the brake-band and the driving member; and wedging means arranged between the latter and the shoe so as to produce outward movement of the said shoe upon rearward turning of the driving member, substantially as described.

17. The combination of a driven member having an internal braking-surface; a driving member mounted upon the driven member with one-way connections thereto and extending within the circle of the said braking-surface; an expansible brake-band confronting the latter and having an arm springing from it adjacent to one end; a head pivoted to said arm and forked for engagement with a bar of the frame; and wedging means arranged between the driven member and the brake-band so as to produce outward movement of the driving member, substantially as described.

18. A brake-piece for bicycles, the same comprising a divided band, an arm springing from the same adjacent to one end thereof, and a forked head pivoted to said arm and adapted to engage the bar of the frame, substantially as described.

19. The combination of a driven member having an outstanding disk-like portion at one end with an inturned marginal flange; a driving member mounted upon said driven member on the inner side of the disk-like portion thereof with one-way connections to the driven member and projecting outwardly and within the circle of the inturned flange of the disk; an expansible brake-band interposed between said flange and the driving member and having one end portion fixed through engagement with the frame of the machine; and means interposed between the driving member and the brake-band for expanding the latter upon rearward turning of the driving member, substantially as described.

In testimony whereof I have signed my name to this specification, in the presence of two subscribing witnesses, this 8th day of October, A. D. 1900.

ROLLIN ABELL.

Witnesses:
F. T. DAVIS,
A. R. BROWN.